(12) United States Patent
Mamiya et al.

(10) Patent No.: US 8,696,931 B2
(45) Date of Patent: Apr. 15, 2014

(54) METHOD OF PRODUCTION OF ACTIVATED CARBON FOR REMOVAL OF MERCURY GAS

(75) Inventors: Hideto Mamiya, Aichi (JP); Sunao Inada, Aichi (JP)

(73) Assignee: Futamura Kagaku Kabushiki Kaisha, Aichi (JP)

( * ) Notice: Subject to any disclaimer, the term of this patent is extended or adjusted under 35 U.S.C. 154(b) by 187 days.

(21) Appl. No.: 13/269,641

(22) Filed: Oct. 10, 2011

(65) Prior Publication Data

US 2012/0097892 A1  Apr. 26, 2012

(30) Foreign Application Priority Data

Oct. 22, 2010 (JP) ................................ 2010-237757
Sep. 20, 2011 (JP) ................................ 2011-204649

(51) Int. Cl.
*C01B 31/08* (2006.01)
*C01B 31/12* (2006.01)
*B01J 20/20* (2006.01)

(52) U.S. Cl.
CPC .................................. *C01B 31/084* (2013.01)
USPC ............ 252/184; 252/190; 502/417; 423/99; 423/101; 423/103; 423/106; 423/240 S; 423/242.1

(58) Field of Classification Search
USPC ............. 252/184, 190; 502/417; 423/99, 101, 423/103, 106, 240 S, 242.1
See application file for complete search history.

(56) References Cited

U.S. PATENT DOCUMENTS

| 4,500,327 | A  | * | 2/1985 | Nishino et al. | ................. | 95/134 |
| 6,136,749 | A  | * | 10/2000 | Gadkaree et al. | ............. | 502/183 |
| 6,258,334 | B1 | * | 7/2001 | Gadkaree et al. | ............. | 423/210 |
| 2005/0019240 | A1 | * | 1/2005 | Lu et al. | ........................ | 423/210 |
| 2007/0207923 | A1 | * | 9/2007 | Lu et al. | ........................ | 502/401 |
| 2009/0007785 | A1 | * | 1/2009 | Kimura et al. | ................. | 95/134 |
| 2010/0113266 | A1 | * | 5/2010 | Abe et al. | ..................... | 502/416 |
| 2011/0189065 | A1 | * | 8/2011 | Maggio | ........................ | 423/210 |
| 2012/0097892 | A1 | * | 4/2012 | Mamiya et al. | ................ | 252/184 |

FOREIGN PATENT DOCUMENTS

| EP | 0 145 539 A2 | 6/1985 |
| JP | 59-78915 A | 5/1984 |
| JP | 1-59010 B2 | 9/1984 |
| JP | 60-114338 A | 6/1985 |
| WO | WO-2008/146773 A1 | 4/2008 |

* cited by examiner

*Primary Examiner* — Joseph D Anthony
(74) *Attorney, Agent, or Firm* — Cheng Law Group, PLLC

(57) ABSTRACT

A method of production of activated carbon for removal of mercury gas which provides activated carbon impregnated with both sulfur and iodine which gives a higher mercury gas adsorption performance compared with a conventional activated carbon adsorbent and also enables the prime cost of manufacture to be kept down, that is, a method of production provided with a sulfur impregnation step which adds sulfur to activated carbon and heats the mixture to obtain sulfur-impregnated activated carbon comprised of activated carbon to 100 parts by weight of which sulfur is impregnated in 5 to 20 parts by weight and, after the sulfur impregnation step, an iodine substance impregnation step which adds an aqueous solution containing iodine and an iodine salt to the sulfur-impregnated activated carbon.

2 Claims, 9 Drawing Sheets

METHOD OF PRODUCTION OF ACTIVATED CARBON FOR REMOVAL OF MERCURY GAS

BACKGROUND OF THE INVENTION

1. Field of the Invention

The present invention relates to a method of production of activated carbon for removal of mercury gas, in particular, relates to a method of production of activated carbon which impregnates activated carbon with iodine and sulfur so as to raise the adsorption capacity of mercury.

2. Description of the Related Art

Mercury and other heavy metal ingredients, as seen in the RoHS directive of the European Union etc., requires strict handling and is restricted in use from the viewpoint of health and pollution prevention. However, mercury is known to be produced at the time of burning coal for generating power and from the process of refining of crude oil and has become a problem in treatment of the smoke and dust. Further, mercury is being used for fluorescent lamps or batteries, so safe disposal of used products and waste is being viewed with even more importance than in the past.

In general, for adsorption of mercury vapor, much use is made of an adsorbent using a chemical of iodine, potassium iodide, or other halogen or halide as an adsorption species. This adsorbent uses iodine as a material, so has the problem of a ballooning prime cost of manufacture. Therefore, as a more inexpensive mercury adsorbent, activated carbon carrying sulfur has been proposed (see PLT's 1, 2, 3, etc.) For example, activated carbon and sulfur particles are mixed and the mixture heated at 110 to 400° C. to obtain an adsorbent. However, with an adsorbent of only activated carbon and sulfur, the adsorption performance per unit weight is insufficient.

Separate from this flow, a mercury gas adsorbent comprised of activated carbon which carries sulfur and an iodide or bromide has been proposed (see PLT 4 etc.) According to the method of preparation of an absorbent of Example 1 disclosed on page 2 of that PLT 4, the activated carbon is uniformly sprayed with a predetermined amount of an aqueous solution in which a bromide, iodide, sulfate, or nitrate has been dissolved, then a predetermined amount of sulfur particles is mixed in and the result is heated in the air at 110° C.

In general, it is known that the reaction speed when mercury and iodine bond is faster than the reaction speed when mercury and sulfur react. In particular, PLT 4 uses both iodine and sulfur, so can be said to raise the adsorption efficiency of mercury while utilizing the difference in the reaction speed. However, iodine is higher in price compared with sulfur, so when hoping for the desired mercury adsorption capability, regardless of what one wants, the material costs end up rising.

CITATION LIST

Patent Literature

PLT 1: Japanese Patent Publication (A) No. 59-78915
PLT 2: Japanese Patent Publication (A) No. 60-114338
PLT 3: WO2008/146773
PLT 4: Japanese Patent Publication (B2) No. 1-59010

SUMMARY OF INVENTION

After this, the inventors engaged in further studies taking note of sulfur and iodine as substances for adsorption of mercury. As a result, they discovered a method of production which controls the order and amount of impregnation into the activated carbon forming the base material of the adsorbent so as to further raise the adsorption efficiency of mercury.

The present invention was made in consideration of the above point and provides a method of production of activated carbon for removal of mercury gas which enables the production of activated carbon impregnated with both sulfur and iodine which gives a higher mercury adsorption performance than a conventional activated carbon adsorbent and which can be reduced in prime cost of manufacture.

That is, the aspect of the invention of claim 1 relates to a method of production of activated carbon for removal of mercury gas which is characterized by a sulfur impregnation step which adds sulfur to activated carbon and heats the mixture to obtain sulfur-impregnated activated carbon and, after the sulfur impregnation step, an iodine substance impregnation step which adds iodine substances to the sulfur-impregnated activated carbon.

The aspect of the invention of claim 2 relates to a method of production of activated carbon for removal of mercury gas as set forth in claim 1, wherein the sulfur-impregnated activated carbon is comprised of activated carbon to 100 parts by weight of which sulfur is impregnated in 5 to 20 parts by weight.

The aspect of the invention of claim 3 relates to a method of production of activated carbon for removal of mercury gas wherein the iodine substance impregnation step is a step of adding an aqueous solution containing iodine and an iodine salt to the sulfur-impregnated activated carbon.

According to the method of production of activated carbon for removal of mercury gas as set forth in the aspect of the invention of claim 1, provision is made of a sulfur impregnation step which adds sulfur to activated carbon and heats the mixture to obtain sulfur-impregnated activated carbon and, after the sulfur impregnation step, an iodine substance impregnation step which adds iodine substances to the sulfur-impregnated activated carbon, so it is possible to provide activated carbon impregnated with both sulfur and iodine which gives a higher mercury adsorption performance compared with a conventional activated carbon adsorbent.

According to the method of production of activated carbon for removal of mercury gas as set forth in the aspect of the invention of claim 2, there is provided the aspect of the invention of claim 1 wherein the sulfur-impregnated activated carbon is comprised of activated carbon to 100 parts by weight of which sulfur is impregnated in an amount of 5 to 20 parts by weight, so it is possible to increase the adsorption performance of mercury gas in accordance with the amount of impregnation of sulfur. Further, the impregnated amount of the iodine substances can be suppressed while increasing the impregnated amount of sulfur, so it becomes possible to reduce the prime cost of manufacture in a relative basis.

According to the method of production of activated carbon for removal of mercury gas as set forth in the aspect of the invention of claim 3, there is provided the aspect of the invention of claim 1 wherein the iodine substance impregnation step is a step which adds an aqueous solution containing iodine and an iodine salt to the sulfur-impregnated activated carbon, so the iodine can be dissolved and the convenience in handling is greatly improved compared with only solid iodine.

BRIEF DESCRIPTION OF DRAWINGS

These and other objects and features of the present invention will become clearer from the following description of the preferred embodiments given with reference to the attached drawings, in which.

DESCRIPTION OF PREFERRED EMBODIMENTS

Figure 1:
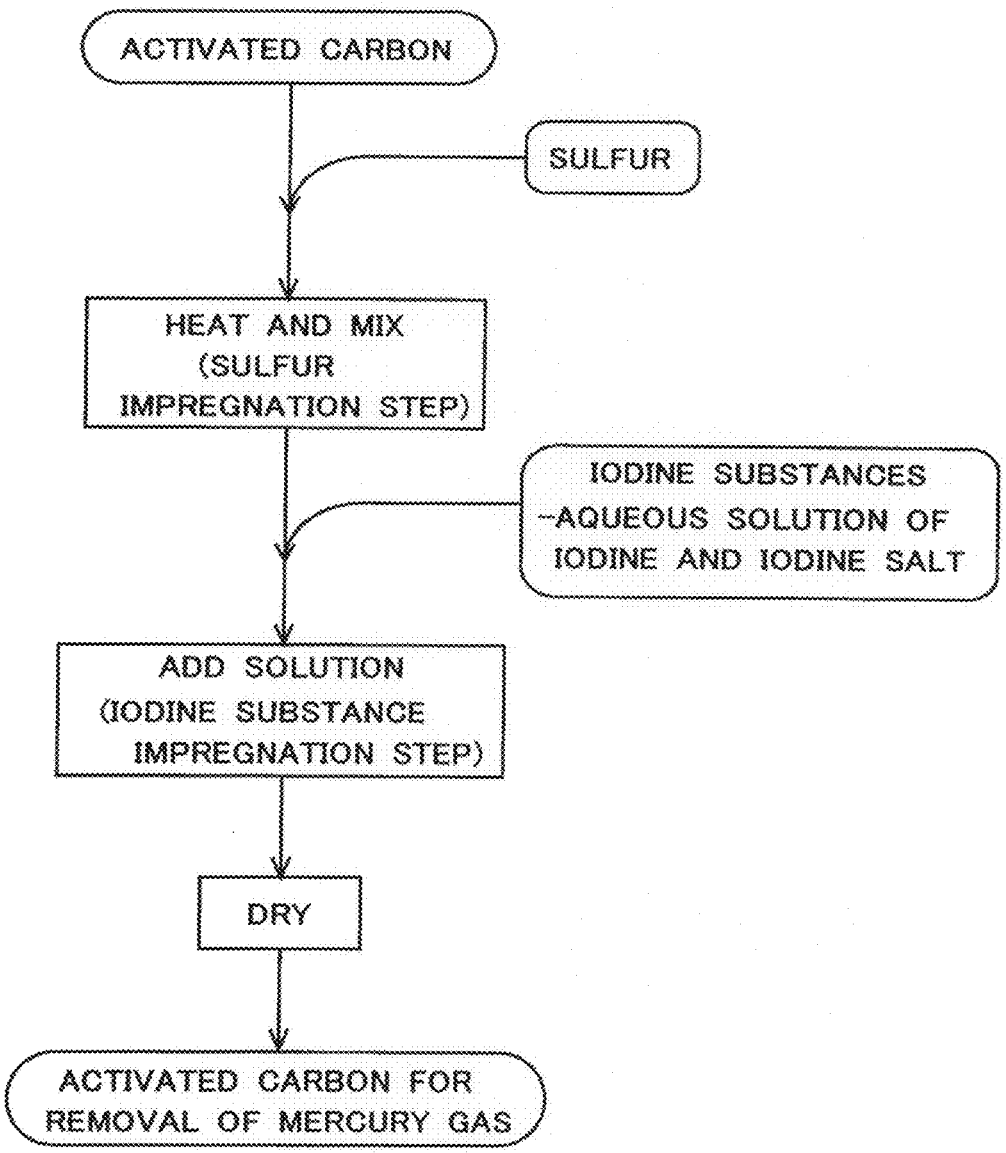
FIG. 1 is a schematic process diagram of a method of production of activated carbon for removal of mercury gas of the present invention.

The "activated carbon for removal of mercury gas" which is prepared by the method of production of the present invention is an activated carbon adsorbent which contains both iodine and sulfur. It utilizes the reactions of "$Hg + I_2 \rightarrow HgI_2$" and "$Hg + S \rightarrow HgS$" to raise the adsorption efficiency of mercury by a synthesis reaction derived from the iodine and sulfur. In particular, the big point of difference of the method of production of activated carbon for removal of mercury gas of the present invention from the conventional method of production is that the order of impregnating the activated carbon with sulfur and an iodide is reversed from the above-mentioned PLT 4. That is, first, sulfur is impregnated at the activated carbon surface, then the iodine substances are impregnated. After this, the explanation will be given while using the schematic process diagram of FIG. 1.

For the activated carbon serving as the base material for the activated carbon for removal of mercury gas, any activated carbon such as fibrous activated carbon, granular activated carbon, and powdered activated carbon can be used. For example, granular activated carbon is a carbon material obtained by using wood, coal, coconut shells, etc. as material, heating and firing this at 800 to 1000° C., and using suitable activation to form pores. Further, powdered activated carbon is activated carbon obtained by crushing the above granular activated carbon to a further suitable particle size. Fibrous activated carbon is a carburized and activated material obtained using phenol resin or another synthetic resin as a material. As explained in the later examples, as the activated carbon for removal of mercury gas, since this is to be packed into a column, considering the convenience of handling, granular activated carbon is preferably used. Of course, it is also possible to use different shapes of activated carbon depending on the installation site and installation method.

First, sulfur is added to the activated carbon, then the mixture is heated to prepare the sulfur-impregnated activated carbon (sulfur impregnation step). In the same sulfur impregnation step, the surface of the activated carbon is coated by melted fluidized sulfur. In accordance with this, the amount of heat and heating power required for melting the sulfur are supplied. For example, the activated carbon and sulfur are sprinkled and mixed in a metal container, then a burner, electric heating wires, etc. is used to heat the mixture to about 100° C. or more. If considering this temperature, the state of the sulfur is guessed to be monoclinic sulfur ($\gamma$-sulfur).

The sulfur-impregnated activated carbon, as prescribed in the aspect of the invention of claim 2, is comprised of activated carbon to 100 parts by weight of which sulfur is impregnated in 5 to 20 parts by weight. Details on the amount of impregnation of sulfur are as described in the following examples. When the amount of impregnation of sulfur is less than 5 parts by weight, the improvement in the adsorption ability of the mercury gas due to bonding with sulfur is low. Further, if the amount of impregnation of sulfur is over 20 parts by weight, along with the increase of the amount of sulfur, the amount of adsorption of mercury gas is increased. However, if considering the production expenses and adsorption effect, the amount of adsorption of sulfur is more preferably 20 parts by weight which may be considered a practical amount. Of course, adsorption of more than that also is possible.

Next, after the sulfur impregnation step, the iodine substances are added to the sulfur-impregnated activated carbon (iodine substance impregnation step). In the iodine substance impregnation step, as prescribed in the aspect of the invention of claim 3, an aqueous solution containing iodine and an iodine salt is added to the sulfur-impregnated activated carbon. Iodine ($I_2$) by itself is insoluble in water, so the iodine is mixed with potassium iodide (KI) or another iodine salt so as to raise the water solubility. Since the result is a solution containing iodine and an iodine salt, this is called the "iodine substances".

For example, when mixing iodine and potassium iodide in water, it is known that these form a complex of $KI_3$ which then remains present in a stable state. Since this becomes a solution in which the iodine ingredient is dissolved, the convenience in handling is greatly improved compared with only solid iodine. When mixing the sulfur-impregnated activated carbon and aqueous solution containing the iodine substances, it is possible to spray the aqueous solution on the sulfur-impregnated activated carbon or to immerse the sulfur-impregnated activated carbon in a liquid vat of the aqueous solution. As the points to note in this case, the sulfur-impregnated activated carbon must be impregnated with a sufficient amount of iodine substances.

After ending the iodine substance impregnation step, drying is performed to evaporate the excess water content. For the drying, a tunnel kiln, rotary kiln, electric drying furnace, or other suitable device is used.

In this way, activated carbon for removal of mercury gas is formed. As the method of use of the activated carbon for removal of mercury gas, a suitable column or inside of a duct collecting filter etc. is packed with it, then the gas to be treated including mercury gas (mercury vapor) is sent into the column. Further, the amount of mercury of the gas to be treated is reduced.

EXAMPLES

The inventors changed the impregnated amounts and the impregnation conditions of the sulfur and the iodine substances and while preparing prototypes of the activated carbon for removal of mercury gas. Further, they ran later explained predetermined concentrations of mercury gas through different examples of activated carbon and evaluated the adsorption performance from the breakthrough times. Note that, the adsorption performance was evaluated at two types of temperature regions of 80° C. (high temperature region side) and 30° C. (low temperature region side).

The "80° C. high temperature region side" is the temperature envisioning removal of mercury gas (mercury vapor) which is contained in the exhaust gas of combustion which is exhausted from mainly coal-fired thermal power stations etc. Further, the "30° C. low temperature region side" is the temperature envisioning removal of mercury gas (mercury vapor) mainly in fluorescent lamp treatment plants etc.

[Materials Used]

When evaluating the adsorption at the 80° C. high temperature region side, activated carbon HC-6 (coconut husk crushed carbon, particle size 4 to 8 mesh (4.75 to 2.36 mm), packing density 0.51 g/ml, benzene adsorption ability 30.7%) made by Tsurumi Coal Co., Ltd. was used. When evaluating the adsorption at the 30° C. low temperature region side, activated carbon 4GM (coal-based granulated carbon, particle size 4 to 6 mesh (4.75 to 3.35 mm), packing density 0.47 g/ml, benzene adsorption ability 32.6%) made by Tsurumi Coal Co., Ltd. was used. Further, sulfur (powdered) made by Kanto Chemical and iodine and potassium iodide made by the same firm were used. The sulfur, iodine, and potassium iodide had common temperature regions.

[Preparation of Activated Carbon for Removal of Mercury Gas at High Temperature Region Side]

First, activated carbon HC-6 (crushed coconut shell carbon) was taken up in 20 g amounts and weights of sulfur corresponding to 5 wt % to 20 wt % of the activated carbon (that is, 1 g to 4 g) were added and mixed with the same. Each mixture of activated carbon and sulfur was charged into an iron container. To prepare the mixture from splattering, the top of the container was covered with a lid and the iron container was fanned by the flame of a burner from the bottom of the container while heating to the melting point of the sulfur so as to impregnate the activated carbon with the sulfur. Sulfur-impregnated activated carbons in accordance with the individual impregnated amounts of sulfur were therefore obtained. In the examples, "wt %" are synonymous with "parts by weight" (same below).

When impregnating the iodine substances, 5 g amounts of the iodine and the potassium iodide were weighed and dissolved in 100 ml of water to obtain a mixed solution. 100 ml of a mixed solution dissolves a total of 10 g of iodine substances ($I_2$+KI). This mixed solution was taken up in an amount of 2 ml and diluted by water to 20 ml to obtain a diluted solution. To this diluted solution, sulfur-impregnated activated carbon (activated carbon ingredient 20 g) was immersed and allowed to stand. The sulfur-impregnated activated carbon was taken out from the diluted solution and dried. In this way, activated carbon for removal of mercury gas was prepared.

Next, when increasing the impregnated amount of the iodine substances, 4 ml was taken up from the mixed solution and diluted by water to obtain a 20 ml diluted solution. To this diluted solution, the sulfur-impregnated activated carbon (activated carbon ingredient of 20 g) was immersed and allowed to stand. Furthermore, when increasing the impregnated amount of the iodine substances, the sulfur-impregnated activated carbon (activated carbon ingredient of 20 g) was immersed and allowed to stand in the mixed solution 20 ml.

The total iodine substances in the diluted solution obtained by taking up 2 ml of the mixed solution and diluting it to 20 ml was 0.2 g. Therefore, if assuming that the iodine substances completely impregnate the sulfur-impregnated activated carbon, in calculations, the iodine substances are impregnated in 0.2 g. If converting this to an amount per gram of activated carbon, the impregnated amount of the iodine substances becomes 0.01 g (impregnated amount 1%) {iodine alone, 9 mg} (Examples 1 to 5 and Comparative Example 2). Similarly, the total iodine substances in the diluted solution which was prepared by taking up 4 ml of the mixed solution and diluting it to 20 ml was 0.4 g, while the iodine substance was impregnated up to 0.4 g. If converted to gram of activated carbon, the impregnated amount of the iodine substances becomes 0.02 g (impregnated amount 2%) {with iodine alone, 18 mg} (Examples 6 and 7 and Comparative Example 3 and 9). Further, when directly using the above mixed solution 20 ml, if converted to gram of activated carbon, the impregnated amount of the iodine substances becomes 0.1 g (impregnated amount 10%) {with iodine alone, 90 mg} (Comparative Example 5).

In accordance with the above-mentioned procedure, the activated carbons for removal of mercury gas of Examples 1 to Examples 7 were prepared. For comparison, activated carbons for removal of mercury gas comprised of the same amount of activated carbon as the examples but not impregnated by sulfur but impregnated by only iodine substances by an impregnation technique similar to that described above were prepared (Comparative Examples 2 to 5). Further, activated carbons for removal of mercury gas comprised of the same amount of activated carbon as the examples but not impregnated by iodine substances, but impregnated by only sulfur by an impregnation technique similar to that described above were prepared (Comparative Examples 6 to 8). As a control, the activated carbon forming the starting substance (HC-6 (coconut husk crushed carbon)) alone was also prepared (Comparative Example 1). Furthermore, activated carbon for removal of mercury gas reversed in the order of impregnation, from the method of production making the order of impregnation "sulfur" and "iodine substances" in the activated carbon disclosed in the examples, to the reverse order of "iodine substances" and "sulfur" was also prepared (Comparative Example 9). Comparative Example 9 is similar in impregnation method to that explained above, but the order of impregnation is reversed. In this way, activated carbon for removal of mercury gas of the high temperature region side (Examples 1 to 7) and its comparative examples were obtained.

[Evaluation of Mercury Gas Adsorption Performance (High Temperature Region Side)]

Each of the activated carbon for removal of mercury gas of Examples 1 to 7 and Comparative Examples 1 to 9 was packed into an inside diameter 20 nm column to give a layer height of 100 mm to thereby produce an adsorption column. The adsorption columns were placed inside a 80° C. constant temperature tank where the adsorption columns were run through by concentration 404 mg/m$^3$ mercury gas at a flow rate of 0.16 m/sec. When measuring the mercury gas concentration, the detector tube "No. 40" made by Gastec Corporation was used. The trends in the gas running time (min) and mercury gas concentration (mg/m$^3$) are the graphs of the breakthrough curve of FIG. 2. This graph shows only Examples 6 and Comparative Examples 1, 5, 6, and 9. The rest of the operation is complicated, so explanations will be omitted.

In accordance with the measurement method of the mercury gas concentration (high temperature region side), activated carbons for removal of mercury gas of Examples 1 to 7 and Comparative Examples 1 to 9 were packed in adsorption columns and the mercury gas concentrations were measured. Therefore, the time (min) required for the mercury gas concentration at the outlet side of the adsorption column to become 2 mg/m$^3$ is found as the breakthrough time. Table 1 shows the impregnated amount of the iodine substances (wt %), the impregnated amount of the sulfur (wt %), and the breakthrough time (min) of the examples and comparative examples.

TABLE 1

| | Calculated value of total impregnated amount (%) of iodine substances (I$_2$ + KI) | Impregnated amount of sulfur (%) | Mercury gas breakthrough time (min) |
|---|---|---|---|
| Ex. 1 | 1 | 5 | 92 |
| Ex. 2 | 1 | 6 | 225 |
| Ex. 3 | 1 | 8 | 288 |
| Ex. 4 | 1 | 10 | 300 |
| Ex. 5 | 1 | 20 | 590 |
| Ex. 6 | 2 | 5 | 318 |
| Ex. 7 | 2 | 10 | 783 |
| Comp. Ex. 1 | 0 | 0 | 1 or less |
| Comp. Ex. 2 | 1 | 0 | 13 |
| Comp. Ex. 3 | 2 | 0 | 20 |
| Comp. Ex. 4 | 4 | 0 | 37 |
| Comp. Ex. 5 | 10 | 0 | 113 |
| Comp. Ex. 6 | 0 | 5 | 3 or less |
| Comp. Ex. 7 | 0 | 10 | 5 or less |
| Comp. Ex. 8 | 0 | 20 | 23 |
| Comp. Ex. 9 | 2 | 5 | 182 |

[Findings and Considerations (High Temperature Region Side)]

Figure 2:
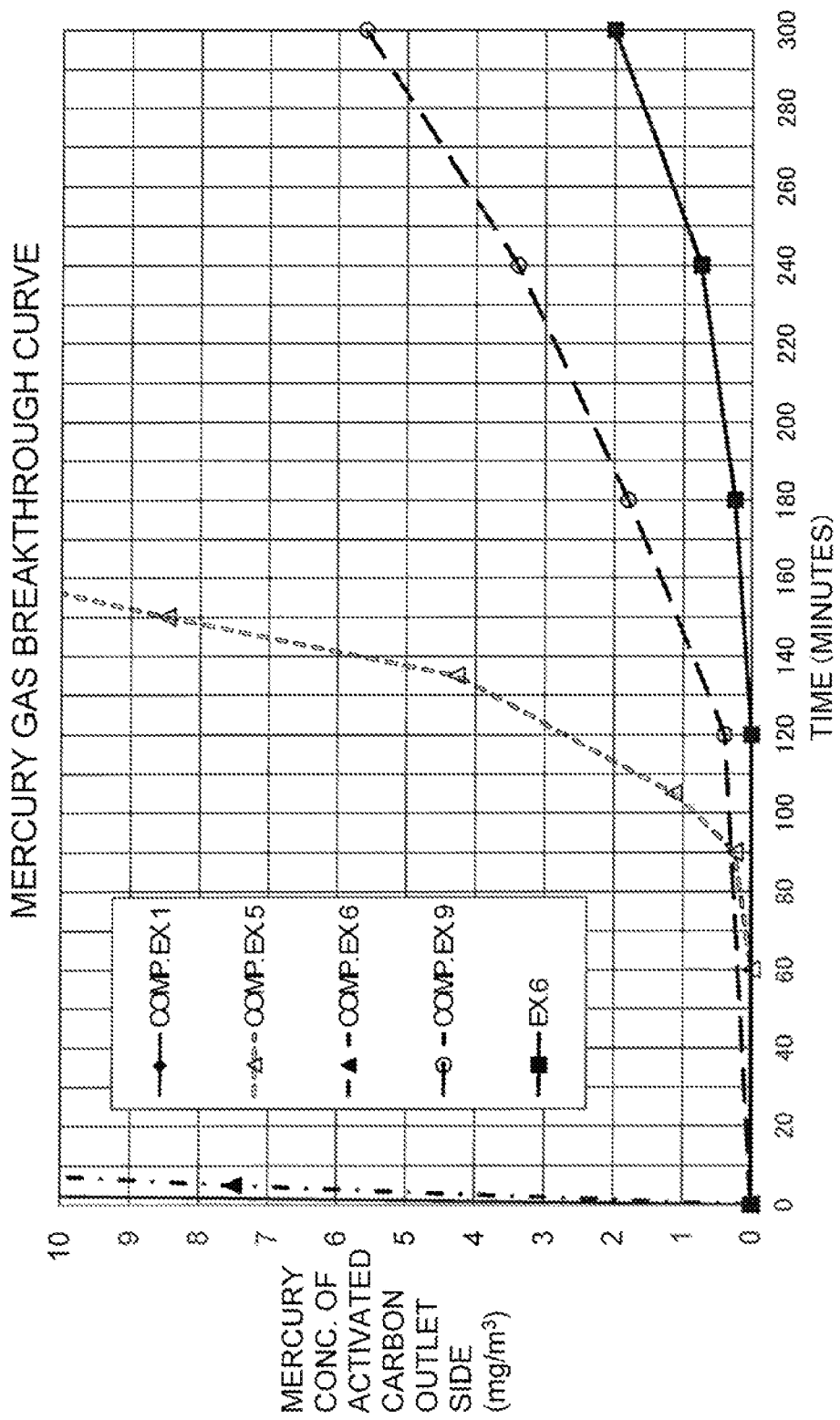
FIG. 2 is a graph of a mercury gas breakthrough curve.

Regarding the graph of FIG. 2, for impregnation of only activated carbon of Comparative Example 1 and for impregnation of only sulfur for Comparative Example 6, almost no effect was shown for adsorption of mercury gas. Comparative Example 5 impregnated by only iodine substances was impregnated with a high concentration of iodine, so the mercury adsorption performance rose over those of Comparative Examples 1 and 6 as well. Next, as in Comparative Example 9 forming the prior art, activated carbon for removal of mercury gas comprised of activated carbon impregnated with iodine substances and sulfur in that order exhibited adsorption performance of mercury gas due to the actions of both the iodine and sulfur.

Further, in the case of Example 6 of the present invention, the impregnated amounts of the iodine substances and sulfur were made the same as with Comparative Example 9, but the order was switched for impregnation, whereupon a strikingly better adsorption performance was exhibited compared with Comparative Example 9. That is, it became clear that the order of impregnation of the sulfur and iodine substances had a great effect on the adsorption performance of mercury gas.

From Table 1, from the results of Comparative Examples 2 to 8, if the ingredients which are impregnated in the activated carbon are just one of the iodine substances or sulfur, a sufficient mercury gas adsorption performance is hard to exhibited. Further, as shown in Comparative Example 5, to improve the performance, it is necessary to increase the impregnated amount of the iodine substances.

As opposed to this, in Examples 1 to 5 which prepared prototypes based on the order of impregnation of the present invention, by keeping down the impregnated amount of the iodine substances to 1 wt % while increasing the impregnated amount of sulfur, it was possible to strikingly improve the mercury gas adsorption performance. Further, it was possible to further increase the impregnated amounts of the iodine substances and sulfur so as to much further raise the mercury gas adsorption performance (see Examples 6 and 7).

Regarding the impregnated amount of sulfur, while this is defined by a relationship with the impregnated amount of the iodine substances, from the trends in Examples 1 to 5, the greater the impregnated amount, the better the adsorption performance. However, if envisioning products to be shipped to the market as activated carbon for removal of mercury gas, it is preferable to make the impregnated amount of sulfur at least 5 wt % (at least 5 parts by weight of sulfur with respect to 100 parts by weight of activated carbon) as the range in which performance can be sufficiently exhibited. Further, 20 wt % (20 parts by weight of sulfur) or so is considered the practical upper limit.

The price of sulfur is an inexpensive one of about 1/10 to 1/20 that of iodine or potassium iodide. Therefore, like in the examples, keeping down the impregnated amount of the iodine substances while increasing the impregnated amount of sulfur to realize an improvement in the mercury gas adsorption performance also enables relative reduction of the prime cost of manufacture. The adsorption performance per unit weight becomes extremely high. Along with the advantage in terms of performance, there is great meaning from the viewpoint of price competitiveness.

Next, the activated carbons for removal of mercury gas of examples and comparative examples were observed under an electron microscope for differences in surface morphology. The electron micrograph of FIG. 3 (magnification ×2000) is for Comparative Example 1 and shows the state of only activated carbon not impregnated with anything. The electron micrograph (magnification ×2000) of FIG. 4 is for Comparative Example 5 and shows the activated carbon for removal of mercury gas which is impregnated only with the iodine substances to 5 wt % of the activated carbon weight. The electron micrograph (magnification ×2000) of FIG. 5 is for Comparative Example 8 and shows the activated carbon for removal of mercury gas which is impregnated only with sulfur to 20 wt % of the activated carbon weight.

Figure 3:
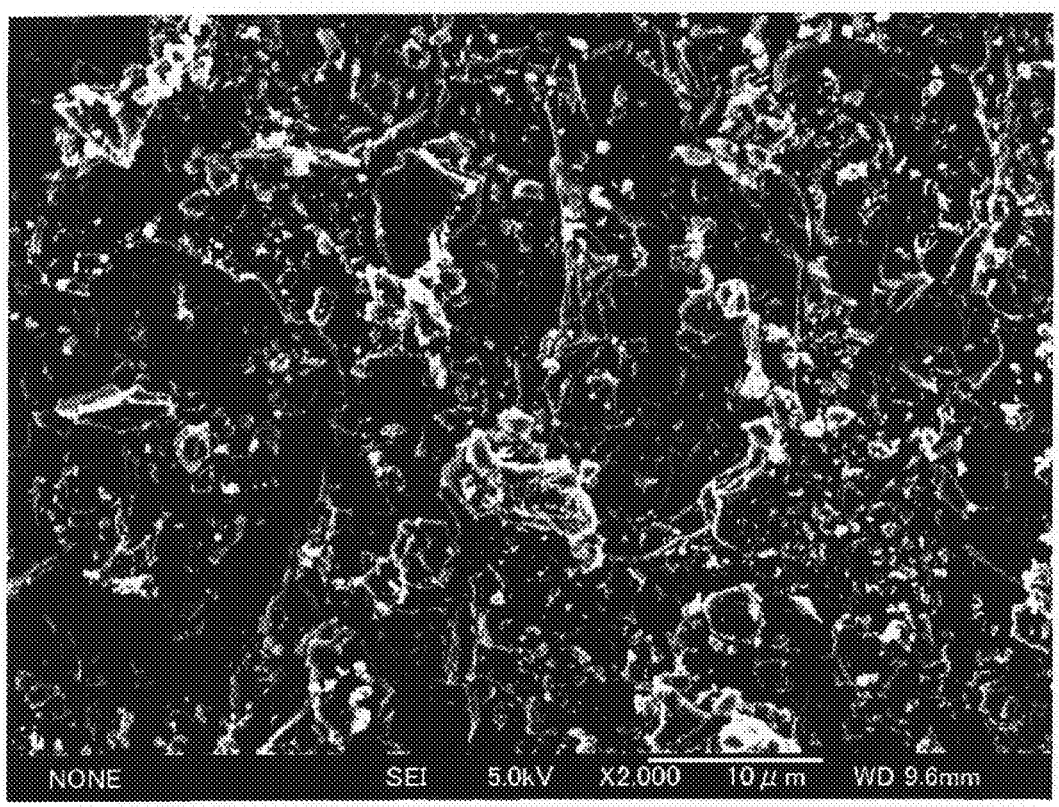
FIG. 3 is an electron micrograph of Comparative Example 1.
Figure 4:
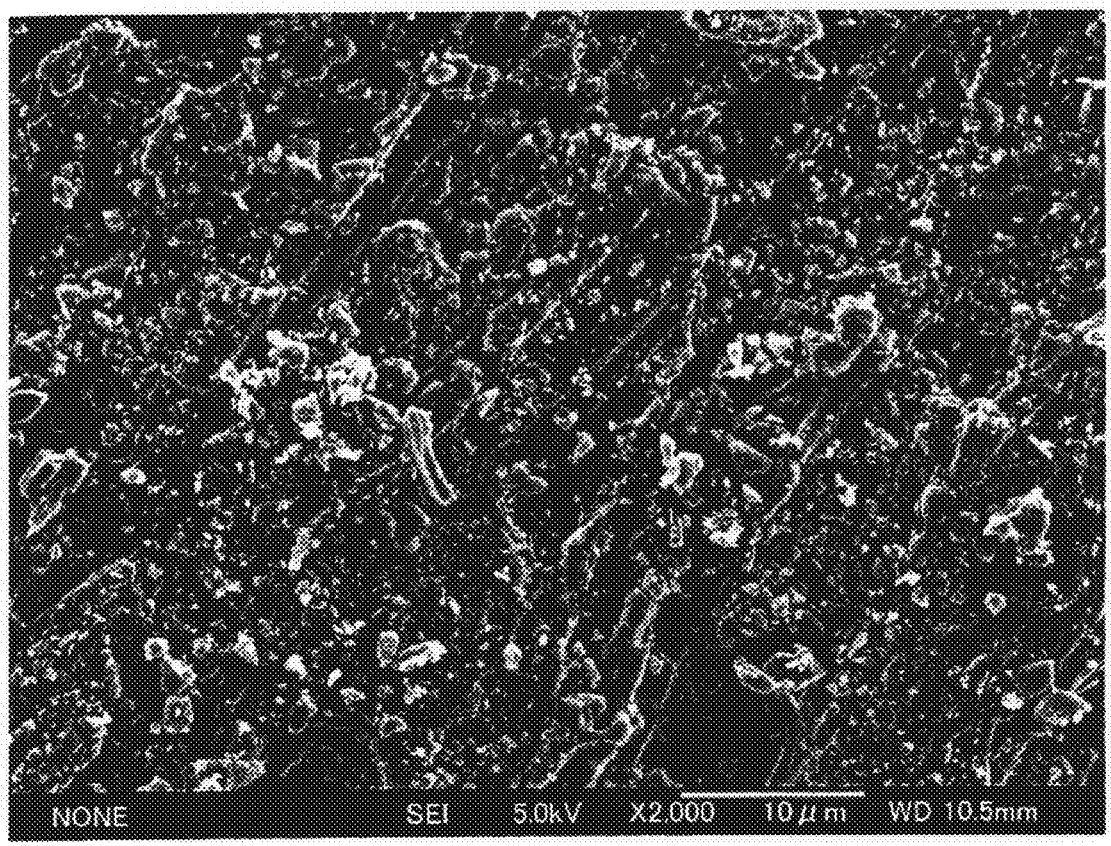
FIG. 4 is an electron micrograph of Comparative Example 5.
Figure 5:
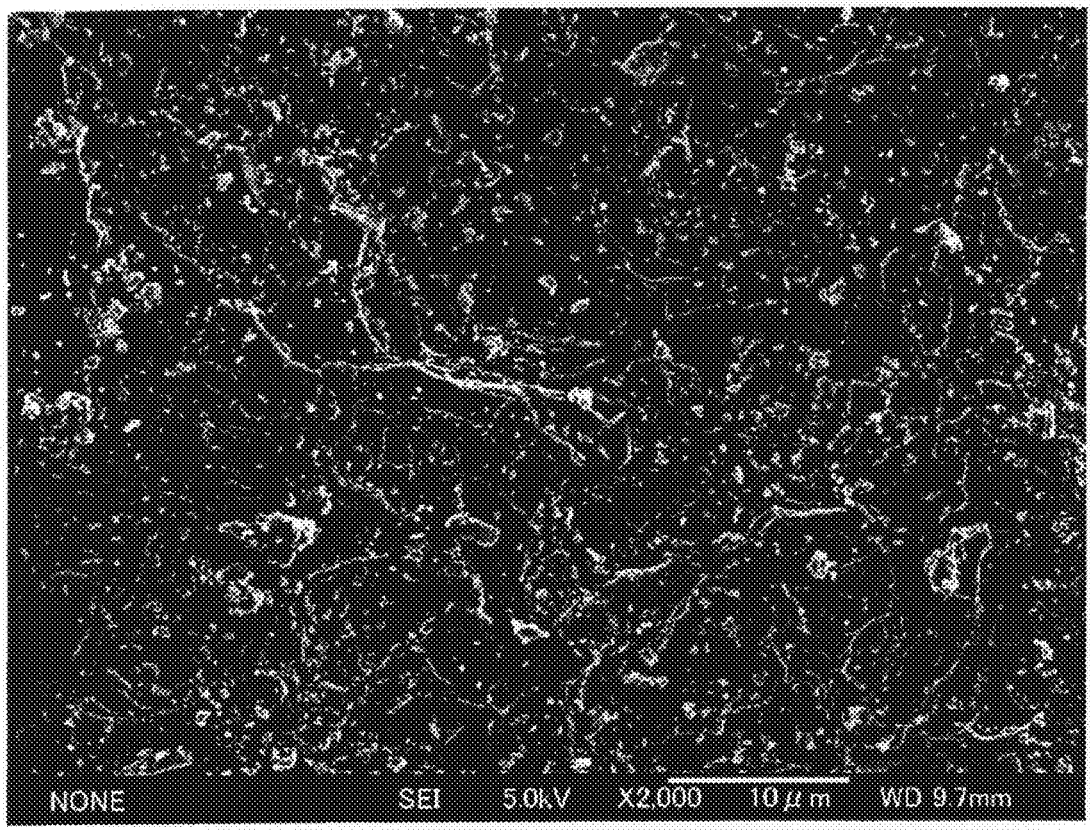
FIG. 5 is an electron micrograph of Comparative Example 8.

If comparing FIG. 3 (Comparative Example 1) and FIG. 4 (Comparative Example 5), in FIG. 4 (Comparative Example 5), many crystals of potassium iodide or iodine forming the iodine substances can be seen. The pores inherent to activated carbon are blocked. Further, if comparing FIG. 3 (Comparative Example 1) and FIG. 5 (Comparative Example 8), it is learned that the sulfur fluidized by the heating coats the activated carbon surface. That is, the iodine substances and sulfur impregnate the activated carbon surface.

Figure 6:
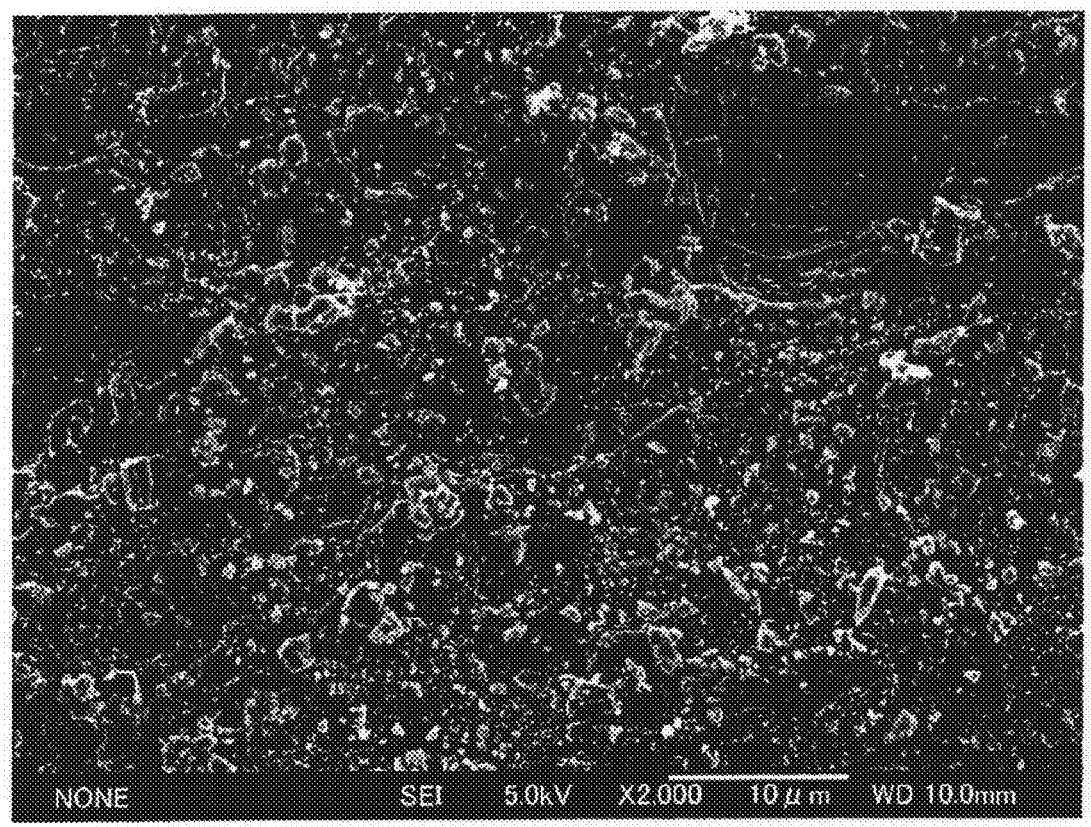
FIG. 6 is a first electron micrograph of Comparative Example 9.
Figure 7:
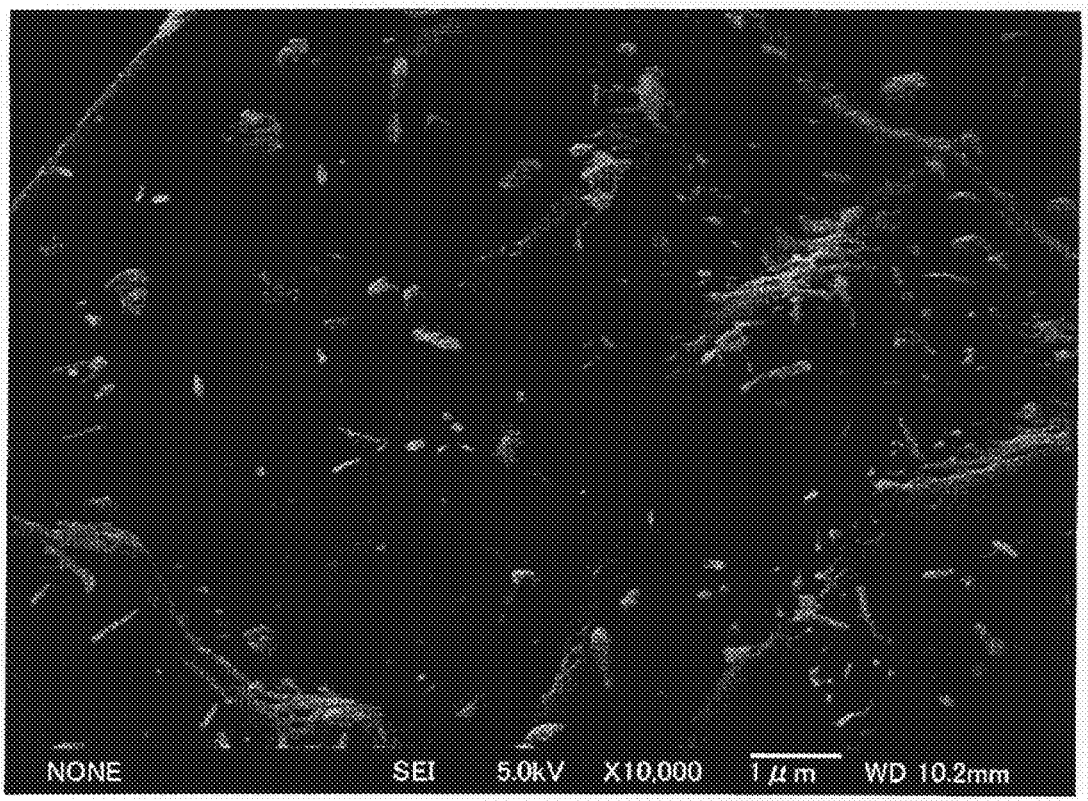
FIG. 7 is a second electron micrograph of Comparative Example 9.
Figure 8:
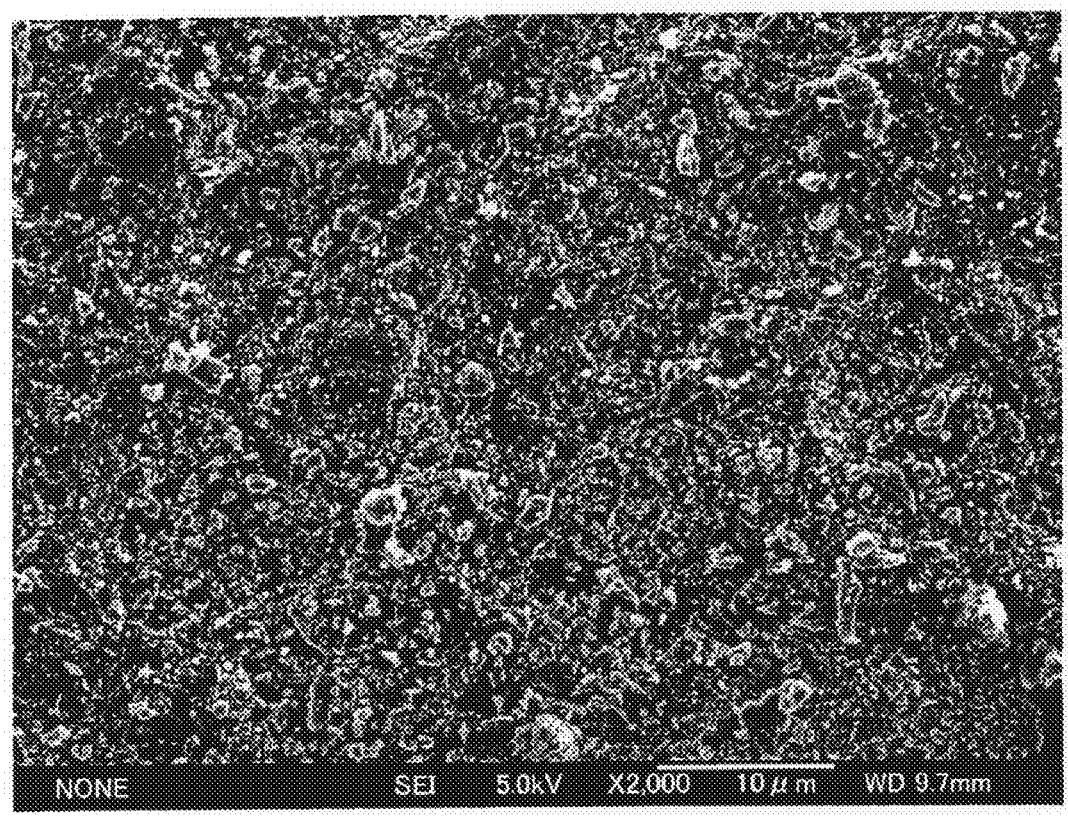
FIG. 8 is a first electron micrograph of Example 6.
Figure 9:
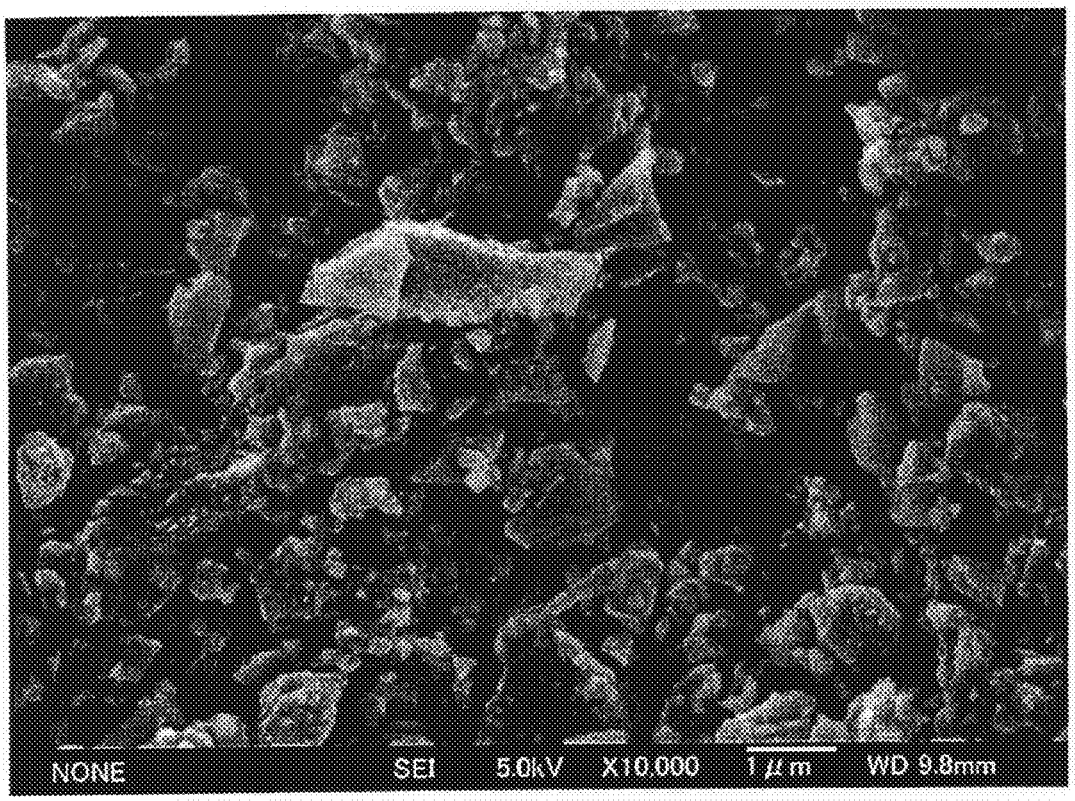
FIG. 9 is a second electron micrograph of Example 6.

The electron micrograph (magnification ×2000) of FIG. 6 and the electron micrograph (magnification ×10000) of FIG. 7 are both for Comparative Example 9 and show activated carbon for removal of mercury gas obtained by the conventional method of impregnation of iodine substances and sulfur in that order. The electron micrograph (magnification ×2000) of FIG. 8 and the electron micrograph (magnification ×10000) of FIG. 9 are both for Example 6 and show activated carbon for removal of mercury gas obtained by impregnation of sulfur and iodine substances in that order.

In Comparative Example 9 of FIG. 6 and FIG. 7, the activated carbon surface is once impregnated with the iodine substances, then is impregnated with the sulfur, so the parts of the iodine substances which are coated by sulfur increase. In particular, as apparent from FIG. 7, the crystals of the potassium iodide and iodine are concealed by the sulfur. Further, in FIG. 7, needle-shaped crystals are observed, but this shows that part of the sulfur is present in the state of γ-sulfur. As opposed to this, as will be understood from FIG. 8 and, in particular, FIG. 9, in Example 6, the sulfur which was fluidized by heating impregnates and coats the activated carbon surface, then the iodine substances are impregnated, so crystals of potassium iodide and iodine develop on the sulfur layer of the activated carbon surface. This is believed close to the state of the above-mentioned FIG. 5 and FIG. 4 superposed.

From this, in Comparative Example 9, despite both the iodine substances and sulfur which play important roles in bonding with the mercury being provided, it became clear that the coating accompanying impregnation of sulfur ends up keeping down the amount of exposure of the iodine substances at the surface. For this reason, there is an effect on the amount of adsorption of mercury gas per unit weight when used as activated carbon for removal of mercury gas. It may be considered that this led to the difference in breakthrough times disclosed in FIG. 2 and Table 1. Therefore, from the results of the series of measurement and observation, it became clear that when impregnating ingredients effective for bonding with mercury, considering the order can result in an extremely great difference in the adsorption performance. Therefore, as defined in the invention of the present application, impregnating the activated carbon with sulfur and iodine substances in that order is important to exhibit a greater mercury gas adsorption performance.

[Preparation of Activated Carbon for Removal of Mercury Gas at Low Temperature Region Side]

The activated carbon used for the above preparation was changed to 4GM (coal-based granulated carbon) and treated by the same procedure as described above to prepare activated carbon for removal of mercury gas of Examples 8 and 9 impregnated with sulfur and iodine substances in that order and their Comparative Examples 10 to 13. In this case, in Example 8, the above mixed solution was taken in 2 ml and diluted to 20 ml to prepare a diluted solution. Therefore, if converted to gram of activated carbon, the impregnated amount of the iodine substances becomes 0.01 g (impregnated amount 1%) {with iodine alone, 9 mg}. Further, in Example 9, the above mixed solution was taken in 6 ml and diluted to 20 ml to prepare a diluted solution. Therefore, if converted to gram of activated carbon, the impregnated amount of the iodine substances becomes 0.03 g (impregnated amount 3%) {with iodine alone, 27 mg}.

Comparative Example 10 was made only the activated carbon (4GM (coal-based granulated carbon)) forming the starting substance. Comparative Example 11 prepared activated carbon for removal of mercury gas without impregnating sulfur in the activated carbon and impregnating only iodine substances by an impregnation method similar to that described above. In Comparative Example 11, the above mixed solution was taken out in an amount of 2 ml and was diluted to 20 ml to prepare a diluted solution for use. Therefore, if converting to gram of activated carbon, the impregnated amount of the iodine substances becomes 0.01 g (impregnated amount 1%) {with iodine alone, 9 mg}. Comparative Example 12 did not impregnate iodine substances in the activated carbon and impregnated only sulfur by an impregnation method similar to that described above. In Comparative Example 13 the above mixed solution 20 ml was directly used. Therefore, if converting to gram of activated carbon, the impregnated amount of the iodine substances becomes 0.1 g (impregnated amount 10%) {with iodine alone, 90 mg}. In this way, activated carbon for removal of mercury gas at the low temperature region side (Examples 8 and 9) and comparative examples of the same were obtained.

[Evaluation of Mercury Gas Adsorption Performance (Low Temperature Region Side)]

Each of the activated carbon for removal of mercury gas of Examples 8 and 9 and Comparative Examples 10 to 13 was packed into an inside diameter 20 mm column to give a layer height of 120 mm to thereby produce an adsorption column. The adsorption columns were placed inside a 30° C. constant temperature tank where the adsorption columns were run through by concentration 9 mg/m$^3$ mercury gas at a flow rate of 0.2 m/sec. The mercury gas concentration at the outlet side of each adsorption column was measured every predetermined time period. When measuring the mercury gas concentration, the detector tube "No. 40" made by Gastec Corporation was used.

In accordance with the measurement method of the mercury gas concentration (low temperature region side), activated carbons for removal of mercury gas of Examples 8 and 9 and Comparative Examples 10 to 13 were packed in adsorption columns and the mercury gas concentrations were measured. Further, $C/C_0=0.05$ was found as the breakthrough point. In the above formula, $C_0$ is the mercury gas concentration at the start of running the gas (concentration at inlet), while C was the concentration of mercury gas after passing through the adsorption column (concentration at outlet). That is, the point of time when the mercury gas concentration became 9 mg/m$^3$×0.05=0.45 mg/m$^3$ was made the breakthrough point. Table 2 shows the impregnated amount of the iodine substances (wt %), impregnated amount of sulfur (wt %), and breakthrough time (hours) for the examples and comparative examples.

TABLE 2

|  | Calculated value of total impregnated amounts (%) of iodine substances ($I_2$ + KI) | Impregnated amount of sulfur (%) | Mercury gas breakthrough time (hours) |
| --- | --- | --- | --- |
| Ex. 8 | 1 | 10 | 100 |
| Ex. 9 | 3 | 10 | 216 or more |
| Comp. Ex. 10 | 0 | 0 | 1 or less |
| Comp. Ex. 11 | 1 | 0 | 13 |
| Comp. Ex. 12 | 0 | 10 | 1 or less |
| Comp. Ex. 13 | 10 | 0 | 138 |

[Findings and Considerations (Low Temperature Region Side)]

As will be easily grasped from the results of the low temperature region side of Table 2, the activated carbons of the present invention which are impregnated by sulfur and iodine substances in that order all exhibited extremely high mercury gas adsorption performance compared with activated carbon which is impregnated by either one of them alone. In particular, regarding Example 9, there was no breakthrough even at the point of time of the elapse of 216 hours from the start of measurement, so the measurement was ended at that point of time. Further, from a comparison of Comparative Example 11 and Comparative Example 13, it is clear that the mercury gas adsorption performance is improved by the increase of the iodine substances. However, like in Example 9, even if suppressing an increase in the iodine substances, it became clear that there was a great improvement in the performance by the addition of sulfur. Therefore, they clarified that the activated carbon for removal of mercury gas based on the method of production of the present invention did not depend on the type of the activated carbon used as the material or the temperature at the time of adsorption and exhibited excellent adsorption performance even at the temperatures corresponding to the treatment conditions.

Even with the sulfur or iodine known as an ingredient which removes mercury from a gas by bonding with the mercury, by changing the order of impregnation of the activated carbon forming the base material, it was possible to obtain an adsorption efficiency not existing in the prior art products. For this reason, even if keeping down the amounts of the individual materials used or reducing the amount of the adsorbent used, similar effects can be exhibited. The result is effective for conserving resources and is advantageous from the viewpoint of price competitiveness.

The invention claimed is:

1. A. method of production of activated carbon for removal, of mercury gas consisting essentially of
   a sulfur impregnation step which adds sulfur to activated carbon and heats the mixture to obtain sulfur-impregnated activated carbon and, after said sulfur impregnation step,
   an iodine substance impregnation step which adds iodine substances to said sulfur-impregnated activated carbon;
   wherein said sulfur-impregnated activated carbon is comprised of said activated carbon to 100 parts by weight of which said sulfur is impregnated in 6 to 20 pails by weight.

2. A method of production of activated carbon for removal of mercury gas as set forth in claim 1, wherein said iodine substance impregnation step is a step of adding an aqueous solution containing iodine and an iodine salt to said sulfur-impregnated activated carbon.

* * * * *